Nov. 8, 1927.   1,648,375
H. L. WHITTEMORE ET AL
PROVING RING
Filed Sept. 14, 1926   2 Sheets-Sheet 1
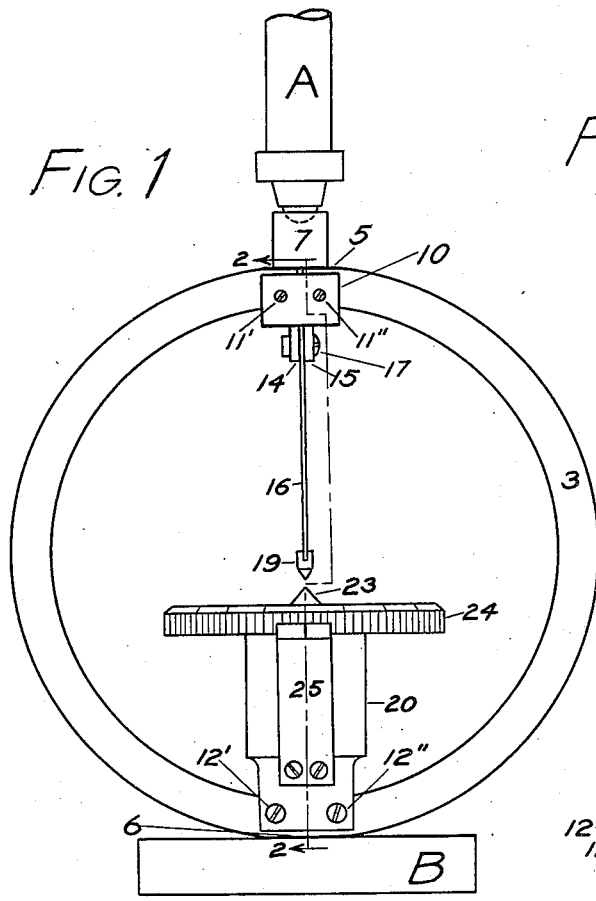
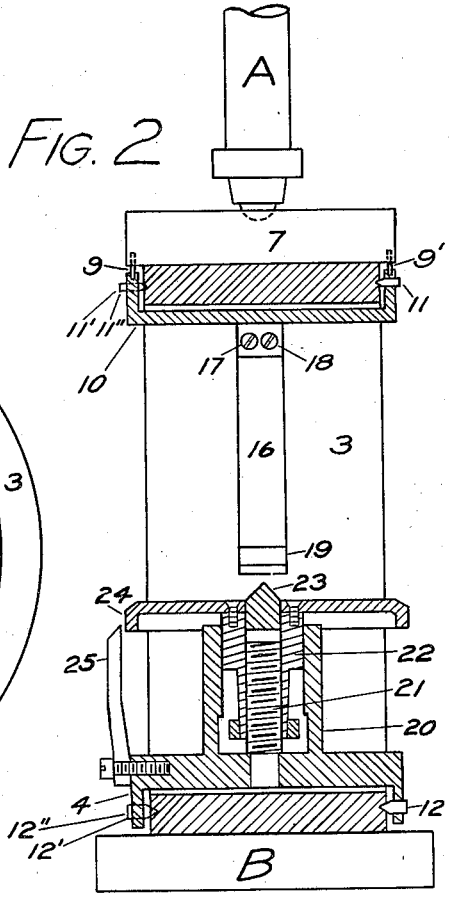
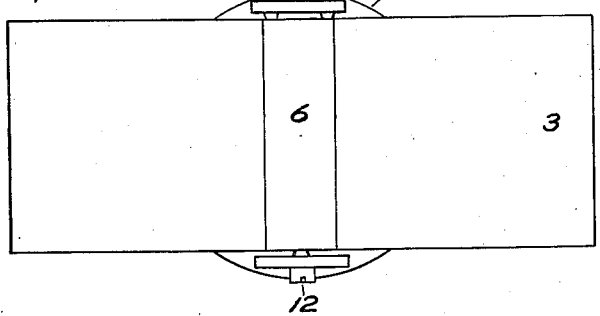
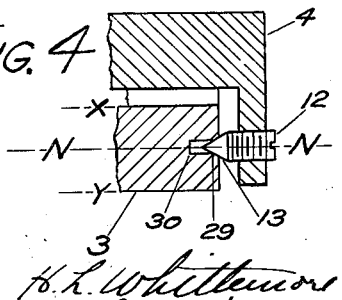
INVENTORS Nov. 8, 1927.  1,648,375
H. L. WHITTEMORE ET AL
PROVING RING
Filed Sept. 14, 1926  2 Sheets-Sheet 2
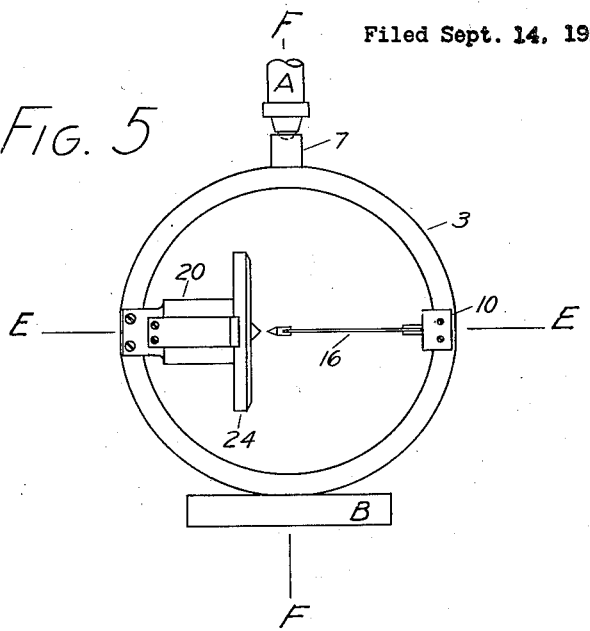
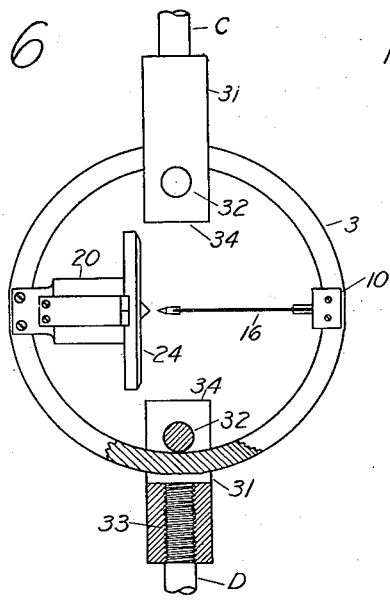
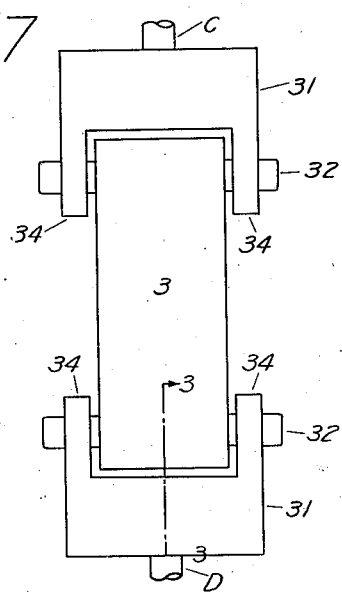
Herbert L. Whittemore
Serge N. Petrenko
INVENTORS Patented Nov. 8, 1927.

1,648,375

UNITED STATES PATENT OFFICE.

HERBERT L. WHITTEMORE AND SERGE NICHOLAS PETRENKO, OF WASHINGTON, DISTRICT OF COLUMBIA.

PROVING RING.

Application filed September 14, 1926. Serial No. 135,358.

The objects of our invention are to produce a proving instrument that will be accurate, rugged, simple in design, that will retain a constant calibration after use, disassembling, or lapse of time, that may be assembled or disassembled without special tools or skill, and that will be easy to operate.

In the drawings, Fig. 1 is a front elevation of an instrument embodying the invention, mounted in position for compression between the upper head A and the lower head B of a Brinell testing machine. Fig. 2 is a vertical section taken along the line 2—2 of Fig. 1. Fig. 3 is a bottom view of the instrument alone. Fig. 4 is a fragmentary section of a portion of the instrument along the line 2—2 illustrating on a larger scale the detail of the attachment of the yoke 4 to the ring 3, described below. Fig. 5, is a front elevation of a similar instrument which may be used for compressive loads, acting either along line E—E, parallel to the axis of the reed and the micrometer, or compressive loads acting perpendicular to that direction, along the line F—F. Fig. 6 is a front elevation of the instrument mounted in position for measuring the tensile forces exerted by the two pulling bars, C and D. One of the attachments 31 is shown in section along line 3—3. Fig. 7 is a side elevation of the instrument shown in Fig. 6.

The ring 3, which is made of hardened steel, is ground flat at opposite points to provide top and bottom bearing surfaces 5 and 6. The bottom bearing surface 6, shown best in Fig. 3, is of sufficient width to serve as a stable base for the ring when it is placed in operating position upon the lower head B of a testing machine, as in Fig. 1. We prefer to make the member 3, called the ring, circular in shape in order that it may be produced by a simple turning operation on a lathe, in order to avoid re-entrant angles which may cause hardening cracks when the steel is hardened, and also in order to prevent irregularities in the deflection characteristics of the instrument which may occur when the elastic member is of a more complex shape. The member 3 may be made in other shapes, however.

The top bearing surface 5 of the ring 3 supports the loading block 7 which is removable therefrom. Dowell pins 9 and 9' driven tightly into holes in the under surface of the loading block 7 fit slidingly into respective holes in the upper yoke 10. The upper yoke 10 is secured to the ring 3 by three similar screws 11, 11' and 11''. The lower yoke 4 is secured to the ring 3 by three other similar screws 12, 12' and 12''. Referring to Fig. 4, which shows the detail of the connection between a yoke and the ring 3, it will be seen that contact is made between the conical surface 13 of the screw 12 and a corresponding conical bearing surface 29 drilled in the side surface of the ring 3. The conical bearing surface 29 is formed by counterboring a hole 30.

When the ring 3 is compressed by a force applied by the upper head A and the lower head B of a testing machine, the ring will flatten. At the points of attachment of the yokes 10 and 4, the fibers of the ring near its inner surface, such as those at X in Fig. 4, will be in a state of tension. Also the fibers of the ring near its outer surface, such as those at Y, will be in a state of compression. At approximately the center of thickness of the ring 3 the fibers will neither be in tension nor in compression. This is the condition at the neutral axis of the section, indicated by the line N—N, and upon which are located the centers of holes 30, and of the conical bearing surfaces 29 and the axis of the screw 12. Since the fibers at N are not stressed by a compression of the ring 3, no stress or deformation is communicated by these fibers at N to either of the yokes 10 or 4 through the screws 11 or 12.

Referring to Fig. 3, it will be seen that a single screw 12 is employed to connect the yoke 4 to the ring 3 on one side of the ring, and that two similar screws 12' and 12'' are employed on the opposite side of the ring. This arrangement of the screws prevents the yoke from being reversed with respect to the ring. It will be understood that a similar arrangement of screws 11 is employed to connect the upper yoke 10 to the ring 3. Thus the yokes and the ring may be disconnected and the instrument disassembled and reassembled without danger of an inadvertent reversal of either or both of the yokes, and a possible change in the calibration of the instrument. This arrangement of the screws facilitates the manufacture and assembling of the ring, and also tends to prevent undue stresses being set up in the yokes. The screws 11, 11' and 11'' are differently spaced than the corresponding screws 12, 12′ and 12″, and thus an interchange of the two yokes is prevented.

Two pendant projections 14 and 15 from the upper yoke 10 serve to support the steel vibratory reed 16 which is clamped between the members 14 and 15 by the screw members 17 and 18. At its lower extremity the vibratory reed bears a small weight 19 formed with a wedge shaped downwardly-extending edge.

Integral with the lower yoke 4, the micrometer casing 20 extends upwardly, enclosing the mechanism of the screw micrometer, which may comprise, essentially, the fixed screw 21, the micrometer sleeve 22, and the conical contact member 23 and micrometer dial 24, said contact member 23 and micrometer dial 24 being carried by the sleeve 22. The micrometer dial 24 is adapted to be rotated by hand, and the contact member 23 thereby raised or lowered. The micrometer dial 24 is graduated into divisions each of which may correspond to a change in elevation of the contact member 23 of, for example, 1/4000 of an inch. An index 25 cooperates with the micrometer dial 24 to permit of readings being taken of the various positions of the contact member 23.

As illustrated in the accompanying drawing of the preferred form of the instrument, the removable loading block 7, the vibratory reed 16 and the contact member 23 are in line with the line of action of the load applied. The instrument might be used with reed 16 and the contact member 23 in line with a diameter of the ring perpendicular to the line of action of the load. This position of the ring is shown in Fig. 5. In this latter case, the diameter of the ring occupied by the reed 16 and the contact member 23 would increase under compressive loads and thus furnish a measure of the load. In the case of the preferred form of the instrument the diameter of the ring occupied by the reed 16 and the contact member 23 diminishes under compressive loads, and this diminution is employed as a measure of the load applied.

In use, the instrument is placed in the position shown in Fig. 1, between the upper head A and the lower head B of a testing machine, and a compressive load is applied to the instrument. The operator then deflects the vibratory reed 16 and releases it, thus causing it to vibrate. While the reed is vibrating, the operator turns the micrometer dial 24 until a buzzing sound indicates that the weight 19 is touching the conical contact member 23 as the former vibrates. If the micrometer is properly adjusted for a reading, the buzzing sound will continue for several seconds before the reed 16 ceases to vibrate.

We have made and tested a number of these proving rings which can be used to measure loads up to 3000 kilograms. We have found that successive readings of the dial under a constant load do not vary more than 0.1 of one division of the dial. This corresponds to a difference in load of 2.5 kilograms. The error, therefore, in reading this instrument is 0.083 per cent, which is negligible compared with the other errors which occur in testing materials. When the stress in the ring at no place exceeds the elastic limit of the material of the ring, the flattening, or shortening of the vertical diameter of the ring, has been found to be proportional to the load applied. The relation between the load applied and the deformation obtained may be expressed by the equation: $P = Cn$, where P represents the load applied to the instrument, C represents the calibration constant of the instrument, and n represents the deformation of the instrument expressed in divisions of the dial micrometer. It has been found in practice that the calibration constant C does not change with lapse of time, nor after disassembling and reassembling the instrument.

If loads which are accurately known are applied to the ring and the corresponding readings of the micrometer are recorded, the proving ring may be used to determine the error in the load reading of any testing machine.

The difference between the dial reading under the known load and the dial reading for the same load as indicated by the testing machine to be calibrated is a measure of the error in the testing machine. This difference multiplied by the constant C of the instrument gives the error in kilograms or other load units.

While the operation of the instrument has been described in connection with the proving or checking of a Brinell testing machine, it will be understood that our invention is not limited in its use to this particular testing machine. It is within the scope of our invention to provide suitable connections on the ring adapted to be engaged by the gripping jaws of a tensile testing machine. The instrument may be deformed by the tensile forces applied, and the readings taken in the same manner as described above. The tensile forces are transmitted from the testing machine by means of the pulling bars C and D. These bars have threaded ends which screw into the threaded holes 33 in the attachments 31. These attachments partially enclose the ring 3 by means of inward projecting lugs 34. A cylindrical pin 32 passes through both lugs on each attachment. When tensile forces are applied by means of the pulling bars C and D the pins 32 bear against the inner cylindrical surface of the ring 3 and exert the forces which flex the ring.

To prevent the conical contact member 23 from wearing a groove in the weight 19, we prefer to make the weight 19 of harder steel than the contact 23.

We claim:

1. In combination, an elastic ring adapted to be deformed, two yoke members, means whereby said members are detachably but irreversibly and non-interchangeably connected to the ring at diametrically opposite points thereon, the connections being made only at substantially the neutral axis of the ring when subjected to the deforming action of opposed radially directed forces, a vibratory member supported by one of the yoke members and micrometer means supported by the other yoke member, the micrometer means being adapted to cooperate with the vibratory member to measure the amount of deformation of the ring.

2. In combination, an elastic ring adapted to be deformed, two yoke members, means whereby the latter are connected to the ring at diametrically opposite points and at substantially the neutral axis thereof, vibratory means on one of the yoke members, and means on the other yoke member adapted to cooperate with the vibratory means to measure the amount of deformation of the ring.

3. In combination, an elastic ring adapted to be deformed, two yoke members, means whereby said members are detachably but irreversibly and non-interchangeably connected to the ring at diametrically opposite points thereon, vibratory means on one of the yoke members, and means on the other yoke member adapted to cooperate with the vibratory means to measure the amount of deformation of the ring.

4. In combination, an elastic ring adapted to be deformed, two yoke members, the yoke members being provided with pointed screws adapted to connect the members to the ring respectively at diametrically opposed places, there being countersunk holes in the sides of the ring at such places adapted to receive the pointed screws, the said countersunk holes being situated at the neutral axis of the ring when subjected to opposed forces acting radially thereto, said holes being so spaced along said axis that the yoke members may be attached in only one position relative to the ring, and cooperating means on the yoke members for measuring the deformation of the ring.

5. In a measuring instrument provided with an elastic member adapted to be flexed, yoke members attached to the elastic member, cooperating means on the yoke members respectively for measuring the deflection of the elastic member, and connecting members joining the yoke members to the elastic member at the neutral axis thereof and being spaced along said axis so that deformation stresses in the elastic member will not be communicated to the yoke members.

6. A standardized proving ring, comprising a ring, substantially symmetrical about its axis, said ring adapted to be flexed by opposed radially directed forces and means carried by said ring for measuring variations in one of its diameters.

7. A standardized proving ring, comprising a ring, adapted to be flexed by opposed radially directed forces and means carried by said ring for measuring variations in one of its diameters consisting of a micrometer and vibrating reed, the said micrometer being attached to the ring at one end of a diameter of the ring and the vibrating reed at the other end of the same diameter.

H. L. WHITTEMORE.
S. N. PETRENKO.